United States Patent
Oztaskent

(10) Patent No.: US 8,762,854 B2
(45) Date of Patent: Jun. 24, 2014

(54) SYSTEMS AND METHODS FOR ITEMISING WEB PAGES FOR DISPLAY ON A SCREEN

(75) Inventor: Ant Oztaskent, Bristol (GB)

(73) Assignee: Cabot Communications Limited, Bristol (GB)

( * ) Notice: Subject to any disclaimer, the term of this patent is extended or adjusted under 35 U.S.C. 154(b) by 688 days.

(21) Appl. No.: 12/258,549

(22) Filed: Oct. 27, 2008

(65) Prior Publication Data

US 2009/0119598 A1    May 7, 2009

Related U.S. Application Data

(60) Provisional application No. 60/986,177, filed on Nov. 7, 2007.

(51) Int. Cl.
*G06F 3/00* (2006.01)
*H04L 29/06* (2006.01)

(52) U.S. Cl.
CPC .................................. *H04L 29/06* (2013.01)
USPC .......................................... 715/733; 715/718

(58) Field of Classification Search
USPC ....................... 715/239, 241, 242, 733, 866
See application file for complete search history.

(56) References Cited

U.S. PATENT DOCUMENTS

| | | | | | |
|---|---|---|---|---|---|
| 6,035,330 | A * | 3/2000 | Astiz et al. | ..................... | 709/218 |
| 6,078,961 | A * | 6/2000 | Mourad et al. | ................. | 709/235 |
| 6,226,642 | B1 * | 5/2001 | Beranek et al. | .......... | 348/211.13 |
| 6,300,947 | B1 * | 10/2001 | Kanevsky | ..................... | 715/866 |
| 6,556,217 | B1 * | 4/2003 | Makipaa et al. | .............. | 345/667 |
| 6,978,418 | B1 * | 12/2005 | Bain et al. | ...................... | 715/205 |
| 7,143,347 | B2 | 11/2006 | Su | | |
| 7,200,820 | B1 * | 4/2007 | Stephens | ........................ | 715/838 |
| 7,464,226 | B2 * | 12/2008 | Reinertsen | .................... | 711/118 |
| 7,516,401 | B2 * | 4/2009 | Chen et al. | .................... | 715/234 |
| 7,877,677 | B2 * | 1/2011 | Wyler et al. | ................... | 715/209 |
| 2001/0012024 | A1 * | 8/2001 | Rosin et al. | ................... | 345/841 |
| 2002/0107985 | A1 * | 8/2002 | Hwang et al. | ................. | 709/246 |
| 2002/0145621 | A1 * | 10/2002 | Nguyen | ........................ | 345/718 |
| 2002/0147749 | A1 * | 10/2002 | Ortiz et al. | .................... | 707/523 |
| 2002/0199190 | A1 * | 12/2002 | Su | .................................. | 725/37 |
| 2003/0106025 | A1 * | 6/2003 | Cho et al. | ....................... | 715/523 |
| 2004/0049737 | A1 * | 3/2004 | Simon Hunt et al. | ......... | 715/513 |
| 2004/0179512 | A1 * | 9/2004 | Leblanc et al. | ............... | 370/352 |
| 2004/0221063 | A1 * | 11/2004 | Mogul | .......................... | 709/246 |
| 2006/0018506 | A1 * | 1/2006 | Rodriguez et al. | ............ | 382/100 |
| 2006/0235941 | A1 * | 10/2006 | Arcas et al. | ................... | 709/217 |

(Continued)

FOREIGN PATENT DOCUMENTS

GB          2339374          1/2000

OTHER PUBLICATIONS

European Search Report for EP 07120204 dated Sep. 26, 2008 (6 pages).

*Primary Examiner* — Matt Kim
*Assistant Examiner* — Maryam Ipakchi
(74) *Attorney, Agent, or Firm* — Conley Rose, P.C.

(57) ABSTRACT

Embodiments of the invention provides a method of and apparatus for itemizing web pages for display on a screen in a system comprising a server connected to the internet the server having storage for format data in respect of one or more accessible websites, the method comprising: at a client requesting from the server format data for a requested website; upon receipt of the format data, accessing the website; and when the website has been accessed itemizing locally the website in dependence on the format data.

22 Claims, 5 Drawing Sheets

(56) References Cited

U.S. PATENT DOCUMENTS

| | | | |
|---|---|---|---|
| 2006/0265361 A1* | 11/2006 | Chu | 707/3 |
| 2006/0282409 A1* | 12/2006 | Waldrep | 707/3 |
| 2007/0288841 A1* | 12/2007 | Rohrabaugh et al. | 715/513 |
| 2008/0177825 A1* | 7/2008 | Dubinko et al. | 709/203 |
| 2008/0270890 A1* | 10/2008 | Stern | 715/239 |
| 2008/0301545 A1* | 12/2008 | Zhang et al. | 715/235 |
| 2008/0313532 A1* | 12/2008 | Dames et al. | 715/239 |
| 2010/0146077 A1* | 6/2010 | Davies et al. | 709/219 |

* cited by examiner

```
2110 ─┐  <sls version="1.0">
      ┌─   <item type="sls" file="entertainment.sls">
2120 ─┤         <name="Entertainment">
      │         <desc="Go to a list of entertainment web-sites">
      │         <icon="entertainment.jpg">
      └─   </item>
      ┌─   <item type="sls" file="sports.sls">
2130 ─┤         <name="Sports">
      │         <desc="Go to a list of sports web-sites">
      │         <icon="sports.jpg">
      └─   </item>
      ┌─   <item type="sfd" file="bbc.sfd">
2140 ─┤         <name="BBC News">
      │         <desc="Visit BBC News for up-to-the-minute news,
      │          breaking news, video, audio and feature stories.">
      │         <icon="bbc-news.gif">
      └─   </item>
         </sls>
```

Fig.3

```
2210 ─┐ <sfd version="1.0">
        <site>
      ┌─  <name>BBC News</name>
2220 ─┤   <startpage formatid="top-level-dir">
      │       http://news.bbc.co.uk/1/hi/video_and_audio/default.stm</startpage>
      └─  <id>bbcnews001</id>
      ┌─  <pageformat class="directory" id="top-level-dir">
      │       <finder for="name" type="perl-script">
      │           http://sfdserver.com/bbc-dir-name-extractor.pl</finder>
2230 ─┤       <finder for="url" type="regex">href=\"(.*)\"</finder>
      │       <finder for="description" type="regex">
      │           div class="summary">(.*)</div</finder>
      │       <targetpage class="terminal" id="terminal-content"/>
      └─  </pageformat>
      ┌─  <pageformat class="terminal" id="terminal-content">
      │       <finder for="name" type="perl-script">
2240 ─┤           http://sfdserver.com/bbc-term-name-extractor.pl</finder>
      │       <finder for="url" type="regex">href=\"(.*)\"</finder>
      │       <contentformat type="default">wmv</contentformat>
      └─  </pageformat>
        </site>
        </sfd>
```

Fig. 4

SYSTEMS AND METHODS FOR ITEMISING WEB PAGES FOR DISPLAY ON A SCREEN

CROSS-REFERENCE TO RELATED APPLICATIONS

This application claims the benefit of priority to U.S. application Ser. No. 60/986,177, filed Nov. 7, 2007, the content of which is hereby incorporated by reference in its entirety for all purposes.

FIELD OF INVENTION

The invention relates to a system and method for itemising web pages for display on a screen.

BACKGROUND

In embodiments the invention relates to a system and method for itemising web pages for display on a screen such as a television screen or in some cases the screen of a computer monitor.

There is a need to present web pages on displays other than those for which they are primarily created. In other words, although web pages are primarily created for display on the monitor of a PC or other such computer, there are increasingly different ways in which people access web content via the internet. Examples include web Television or "Web TV" and personal digital assistants (PDAs).

Web pages are generally designed for viewing in a personal computer (PC) environment. Normally, in a PC environment, a mouse is used for navigation, the graphics are displayed on a high-resolution screen, and the user sits very close to the display.

However, in view of the increase in video content on websites, many users wish to view some websites on a television (TV) screen. Displaying a web page directly on a TV screen does not give good results because generally in a TV environment there is no mouse for navigation, the user sits further away from the TV as compared to the distance that he would typically sit from a computer monitor, and if the TV is a standard-definition one, only a small portion of the contents of a typical web page can fit on the screen.

It is clear that there is a need for reformatting and filtering web pages to make them more suitable for displaying on a TV screen and also more suitable for easy navigation with a TV remote control instead of a mouse. A number of systems exist for the reformatting of web pages to make them suitable for viewing on a TV screen but they have a number of significant drawbacks.

U.S. Pat. No. 7,143,347 discloses a method and apparatus for reformatting of content for display on interactive television. Requests from a user (client) for web pages go through a proxy server. The proxy server fetches the content (HTML pages, images, etc.) and translates them to "compiled objects" that are suitable for the client set top box (STB). Instead of the actual content data, the compiled objects are sent back to the STB. A special object interpreter in the STB interprets and displays the compiled objects. There is also a caching mechanism to prevent compiling previously compiled websites again.

However, Web content is not presented as part of the native user interface (UI) of the client STB, so it is not easy to navigate. Furthermore, with each request the proxy has to be informed about the STB model to be able to identify the content format it supports, and the proxy must support all variations in the STBs. All of the translation and reformatting is done at the proxy, so the processing requirements of the proxy are high. Last, if the proxy is down, none of the clients can connect to the Internet and are therefore unable to access web page content via their STBs.

U.S. Pat. No. 6,226,642 discloses a method and apparatus by which modification of content of internet web pages is achieved for television display. Again, requests for web pages go through a proxy server. The proxy server fetches the content and modifies the HTML into a format compatible with the display requirements of the client STB. The reformatted HTML is then sent back to the STB. A browser in the STB interprets and displays the reformatted HTML.

There are some significant disadvantages with this system. For example, with each request the proxy has to be informed about the STB model to be able to identify the content format it supports, and the proxy must support all variations in the STBs. All of the translation is done at the proxy, so the processing requirements are high and so if the proxy is down, none of the clients can connect to the Internet.

An example is described in this patent in which the proxy is on the client. However, there are problems with this arrangement too in that the HTML document is still displayed by a web browser on the client STB, and not as an integral part of the native GUI, so navigation is still difficult. Furthermore, since the proxy component resides on the client, ongoing changes in the world-wide web standards cannot be easily addressed. That is, when some web-sites change their contents and use some new HTML features, the client may not be able to display those web-sites until the proxy software on the clients are updated.

It can be seen then that although attempts have been made to address the general problem of reformatting of web pages and web based content for display on a television systems and the like, most of the available prior art makes use of a proxy for translating HTML content into a format that better suits a TV-type display device. With such an approach, the improvements are limited to making the text bigger, fitting the whole page width onto the screen and adjusting the colour of certain items to reduce flickering. The general usability of world-wide web content on a set-top box that has a remote-control for navigation inside the GUI is not improved.

Furthermore, most of the prior art requires a dedicated proxy for performing the translations, and this increases dependency of the whole system on a single server. Moreover, in most of the prior art, the proxy that performs the translations must know the display capabilities of each set-top box client model, and translate web content accordingly. This further increases system complexity.

According to a first aspect of an embodiment of the invention, there is provided a method of itemising web pages for display on a screen in a system comprising a server connected to the internet the server having storage for format data in respect of one or more accessible websites, the method comprising: at a client requesting from the server format data for a requested website; upon receipt of the format data, accessing the website; and when the website has been accessed itemising locally the website in dependence on the format data.

Preferably, web content is presented as part of the native UI of the client STB, so it is easy and intuitive to navigate for a user.

Whereas most of the prior art requires a dedicated proxy for performing the translations, and this increases dependency of the whole system on a single server in the present invention, the "translation" is preferably performed locally to the client in dependence on the format file and so takes advantage of the processing power of the clients.

In an embodiment, the relevant information is extracted from web-pages at the client and displayed as part of a client's native user interface according to instructions received from a central format description server.

Today's STBs are continuously getting more powerful in terms of their processing capabilities. In contrast to most prior art systems that reformat the content on a special dedicated server, the present system reformats the content on the client. Therefore, processing power requirements for the server can be reduced and no special handling is necessary on the server to format content for different models of receivers. Different clients can reformat web pages differently to suit their native UIs, based on a single web-site format description provided by the format server.

The client is able to process the web data locally and uses this information, based on the received format file, to present web-page contents as a list of items that are easy-to-navigate on its native graphic user interface. The use of a format data server also means that plural users can connect to it so that when a website's format changes the modifications to the format file need only be loaded up to the format server and not to each individual user.

According to a second aspect of an embodiment of the invention, there is provided a system for itemising web pages for display, the system comprising: a server for storing format data indicative of the format of one or more websites; and, one or more clients connectable to the server, at least one of the clients being arranged to request format data of one of the websites from the server, wherein upon receipt of the request, the server is arranged to provide to the requesting client the format data indicative of the format of the respective website, the client being arranged locally to access the website and use the format data to itemise content from the website for display.

According to a third aspect of an embodiment of the invention, there is provided a client for connection to the internet for the itemising of web pages for display, the client comprising: a processor arranged, upon activation by a user, to request and to receive from a format server format details in respect of a requested website; and memory for storage of the format details, the client being configured and arranged to access the website and, itemise locally the contents for display in dependence on the format details.

In one embodiment, the client comprises an HTML itemiser for itemising locally the received website. Preferably, the client comprises an XML parser for parsing received XML documents. Primarily the XML parser is for parsing the SFD and SLS files which are XML documents.

In one embodiment the client the HTML itemiser includes a scripting engine for interpreting commands and a regular expression engine for searching for textual patterns within received HTML code of a website. This enables the data from a received website to be easily itemised.

The client can be embodied in any suitable form in which a user is enabled to access internet content and display it on a display such as a television display. Examples include but are not limited to a stand-alone Set Top Box dedicated for viewing web pages on a television, functionality embedded into a digital television receiver Set Top Box, a digital television recorder, a television receiver, and a personal computer.

As is currently the case, clients such as set top boxes for accessing television include native GUIs. Preferably, the client for use with the present system, is configured and arranged to display itemised websites using the native graphic user interface, i.e. the GUI used already to display conventional television images. This is the GUI that is also used to browse program information and configure the client's settings, etc.

Preferably, the client is arranged, prior to requesting the format details, on activation by a user to request from the format server a list of available websites in respect of which format details are stored by the format server.

In an embodiment, there is provided a method of itemising web pages for display on a screen in a system comprising a server connected to the internet the server having a list of websites that it is able to provide to a client and a database for storing for each of the accessible websites a format file indicative of the format of the respective website, the method comprising: at a client requesting from the said server the format file for a requested website; upon receipt of the format file, accessing the website; and when the website has been accessed itemising the website to extract data from the website in dependence on the format file.

In an embodiment, there is provided a client for use in a system according to the second aspect of the invention, the client comprising: a processor arranged, upon activation by a user, to request and to receive from a format server format details for a website the processor being configured, to access the website and display the contents in accordance with the format details obtained.

BRIEF DESCRIPTION OF THE DRAWINGS

Examples of embodiments of the invention will now be described in detail with reference to the accompanying drawings, in which:

FIGS. 3 and 4 show examples of an SLS file including a list of available websites, and SFD file including the format description for particular websites;

Referring to FIG. 1, an example is shown of a system for itemising web pages. Typically the system would include a plurality of client set-top boxes (STBs) 200 connected to the internet 130 although, for clarity and simplicity, in the example shown, only a single STB 200 is included.

The system comprises a server 140, referred to hereinafter as a format server, including a Database 150, the server being connected to the internet. A TV-type monitor 270 is provided and is used for displaying the output of the client STB. The client STB may be a stand-alone STB dedicated for viewing web pages on a TV, or its functionality may be embedded into a digital TV receiver STB, a digital TV recorder, a TV receiver, or a personal computer. By way of non-limiting example only, henceforth, the description will be in respect of a stand-alone STB.

Through the internet, all standard websites such as www.youtube.com and www.bbc.co.uk 170 are accessible by the client STB 200.

Figure 1:
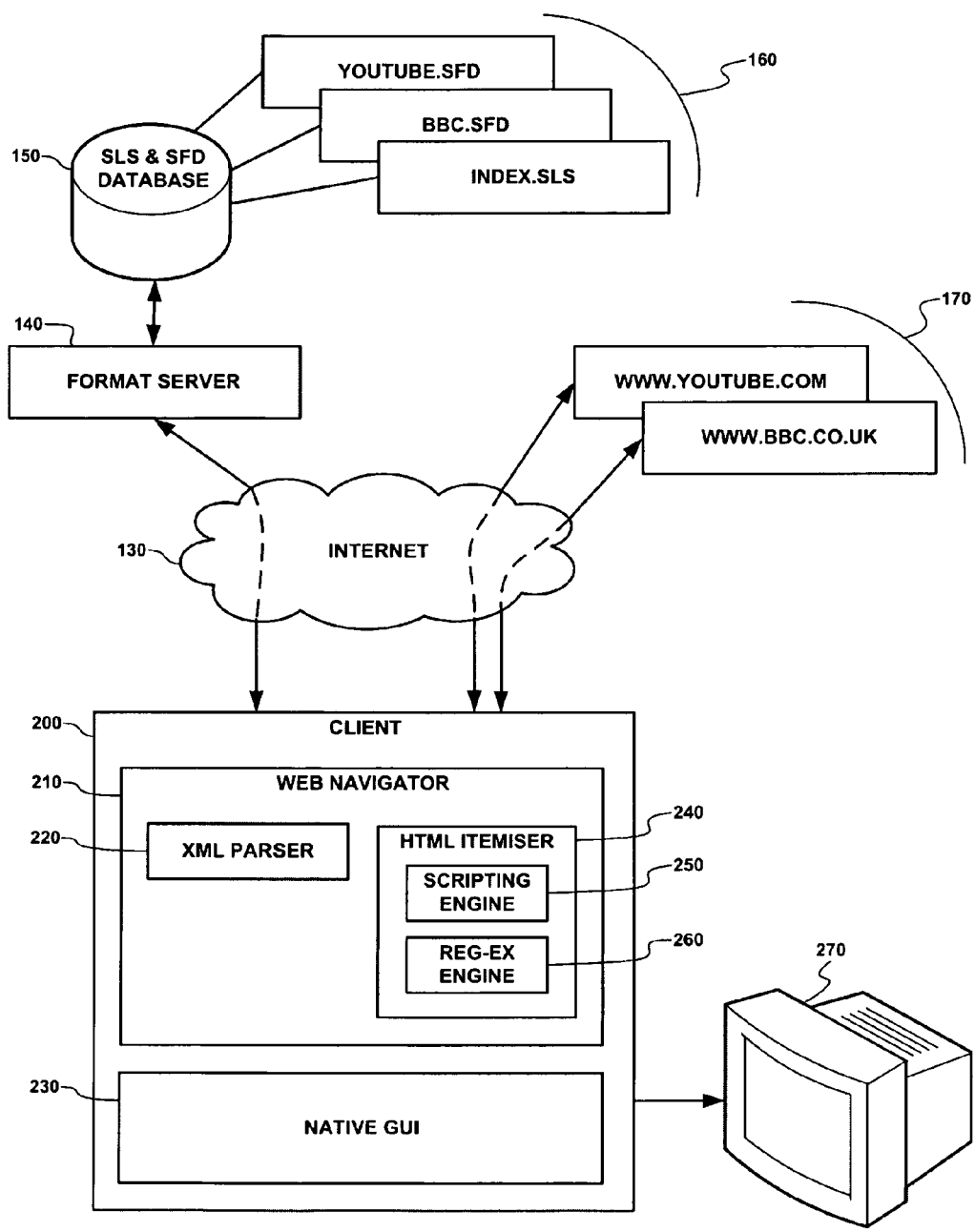
FIG. 1 shows a schematic representation of a system for itemising web pages.

The client includes a graphic user interface GUI which displays the STB's resident application in addition to displaying content from the internet. As used herein, the term "native GUI" refers to this application user interface that is embedded in the client STB. In the art, the native GUI of a device in a TV environment usually allows the user to perform tasks such as setting the user's preferences, browsing program information, changing the channel, or watching recorded material. The system of FIG. 1 is able to display the contents of a web page as part of the client STB's native GUI, so that online content appears as a natural continuation of the native GUI. One particular advantage of this is that navigation becomes technically simplified and as simple to the user as possible. Indeed, the navigation is no different from the navigation of television channels, to which the user is well used.

Most web pages are cluttered with images, animations, and significant amounts of text. As explained above, this makes them unsuitable for displaying on a TV screen. The system of FIG. 1 is capable of extracting only the relevant information from web pages to make them more suitable for display on a TV screen.

The layout of visual elements on a web page is determined by its HTML code. The system of FIG. 1 utilises the concept of data or a file, referred to hereinafter as an "SFD file" (site description file), which contains details about the format of data inside a website's HTML pages. The format server includes or is associated with a Database 150, in which is stored and maintained a plurality of SFD files 160. Each SFD file contains the description or format data of one specific website. The STB 200 uses these SFD files 160 to itemize HTML pages and present them as part of its native GUI.

The client STB 200 includes a web navigator component 210. In a preferred embodiment, the web navigator includes an XML Parser 220 for reading XML-type documents, and an HTML Itemiser 240 for identifying the details of each "interesting" item on a web-page. The HTML Itemiser may typically consist of a Scripting Engine 250 for interpreting commands in a particular scripting language such as Perl, and a Regular Expression Engine 260 for searching for textual patterns directly inside an HTML page. Sources of such engines are known to those skilled in the art.

Referring to FIG. 1, when the user wishes to browse the internet on the client STB, the STB requests from the format server 140 a list of websites known to it and therefore accessible to the STB using the system. These "websites known to the format server" are the websites for which there exist corresponding SFD files in the Database 150, and the list is carried in a Server List (SLS) document.

By way of example, the SFD files may be composed and maintained by the format server administrator, or they may be uploaded to the format server by individual users of the system. Also, the list of known websites may be categorized and returned in a multi-level fashion. For example, an SLS composed of categories of web servers may be returned first, such as entertainment or sports, and when a sub-category is requested another SLS file containing the actual list of websites in that category may be returned. As a minimum, the items of the returned SLS document must include the website name and the universal resource locator (URL) of the website SFD. Optionally, it may include additional details such as a textual description of the website and the URL of a thumbnail image representing the website.

Thus, the server functions as a portal site which contains a list of websites, such as media content sites, on the internet. It does not simply provide a webpage with links, but rather by providing format data to a client STB it "teaches" an STB how to interpret a webpage and display it in its native GUI. The server is only responsible for directing STBs to where the content is on the internet and the STB then connects directly on the internet to media sites such as www.youtube.com.

When the STB 200 receives a list of known web servers from the format server 140, it presents them to the user in its native GUI. The user then selects a website from among those that are presented, and as a result, the STB 200 requests the SFD file corresponding to the selected website from the format server 140.

In response, the format server 140 sends the requested SFD File from the SFD Database 150 to the STB 200.

The SFD file contains the URL for the "entry point" into the requested web server, and also contains methods for classifying and itemising the web pages on the server. In this context, "classifying" a web page means determining which one of the two possible classes a page belongs to: directory-class pages, or terminal-class pages. Terminal-class pages contain media content such as textual information, video streams, or audio streams. Terminal-type pages do not have any sub-pages. Directory-class pages contain a list of sub-elements. Sub-elements of directory-class pages may be other directory-class pages or terminal-class pages.

Itemising a web page means extracting only the relevant links from the web page and determining the properties of those links such as their name, URL and type. As a result, the STB has a list of "items" representing the links on the web page.

The STB 200 reads the received SFD file, and identifies the URL for the "entry point" page on the website. The STB 200 directly requests this page from the web server 160, and when the page is received, the STB itemises it according to the data in the website's SFD file. The preferred method of displaying the items extracted from a web page's HTML is presenting them to the user as a list. The user is preferably allowed to select an item from the list, and if another directory-type page is selected, the same procedure is repeated to itemise the new page.

If the user selects a terminal-type page, the relevant content on the page is extracted according to the information in the web-site's SFD file and the content displayed as part of the STB's native GUI. For example, if the terminal-page is a textual page containing a news article, only the article is extracted and displayed by the GUI. In another example, where a terminal page contains a link to a streaming video source, provided that a corresponding video decoder is present on the STB, the video is played in accordance with the native GUI.

If a website supports a search mechanism, e.g. www.google.com, the details of this search mechanism are also included in the website's SFD file. When the user enters a keyword that he/she wishes to search at a particular website on the client, the client requests the website's SFD file from the format server. As a minimum, the SFD file contains the search URL, the character-escaping method (i.e. how to convert characters that are not allowed in URLs into characters or strings of characters that are allowed), the HTTP submission method (POST or GET) for the website and the format of the results page. Using this information, the client submits the search string to the website's search engine, and the website in due course returns a page containing the results. The client STB itemises the results based on the information in the SFD file, and presents them to the user via the TV display.

The system also allows the data transmission between the format server and the STB to be reduced if the STB downloads the SFD files periodically, for example once every day. The details of this process will become clear with the description of a preferred embodiment below.

There need be no computer or PC involved other than the inherent processing capability of the STB itself. The user interface of the STB is entirely separate from the server and so all STB models are therefore able to display the acquired video content as part of their native GUIs. The user, when viewing internet based video material on a television connected to the STB, does not have to navigate through cumbersome web pages using a remote control that was never designed for the control of web content. Furthermore, since the video material is not streamed from the server, but rather is still obtained from the websites' own host servers, the format server cost and complexity can be kept to a minimum.

In addition, the format server only sends instructions to clients as to how to interpret other websites and does not send HTML pages with links. Therefore, the server does not even have to be up and running all the time because clients can operate without it so long as they have already received the necessary format data.

Figures 5, 6:
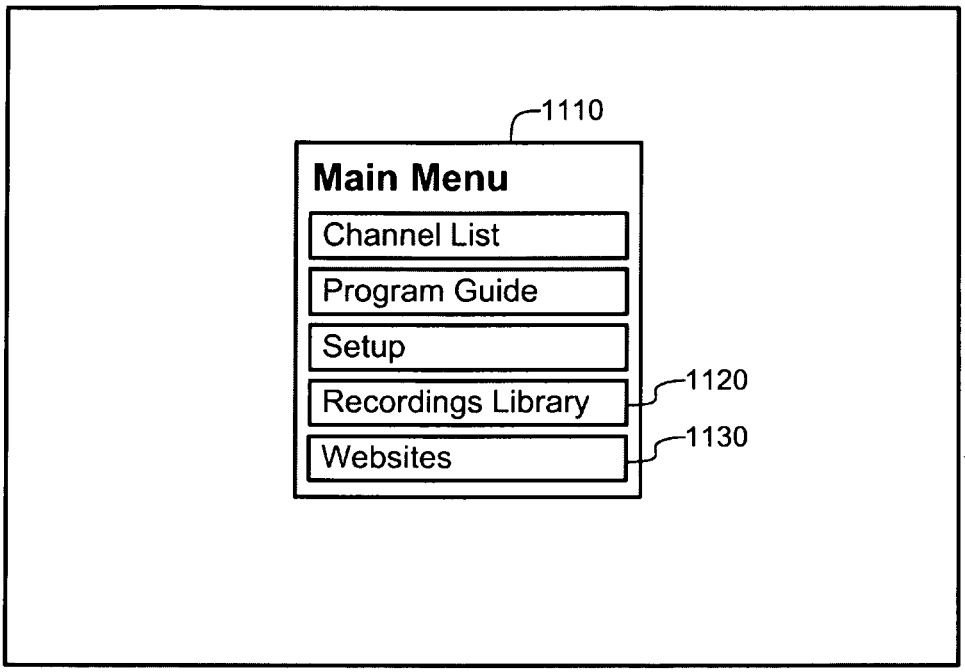
FIG. 5 shows an example of an STB native graphic user interface.
FIGS. 6 to 8 show examples of graphic user interfaces available with the system of FIG. 1.

FIG. 5 shows a schematic representation of an example of the main menu 1110 of an STB's native GUI. In this preferred example, the STB's native GUI includes a "Websites" button 1130, or something similar. Upon activation by a user, this button opens the "Websites" screen, which is a user's entry point to Web content accessible from the STB. Alternatively, the "Websites" button may exist at a different location in the STB's menu structure, or the STB's remote control may have a dedicated button to the same effect.

By way of example only, consider an embodiment of the system incorporated into a Digital Video Recorder (DVR) STB. A DVR records TV programs in digital format and stores them on a hard-drive, to be viewed later by the user. The native GUI in most DVR products includes a screen where all the recorded material can be viewed by the user. FIG. 6 shows schematic representation of a typical native GUI for listing recorded programs on a DVR. As it is an aim of the present system to present web content as a natural continuation of the native GUI, the "Websites" screen of the preferred embodiment is similar to the screens that are part of the native GUI.

Figure 7:

One such embodiment is presented in FIG. 7 where the "look and feel" of the "Websites" page is very similar to that of the native GUI, and particularly to the "Recordings Library" screen shown in FIG. 6.

Figure 2:
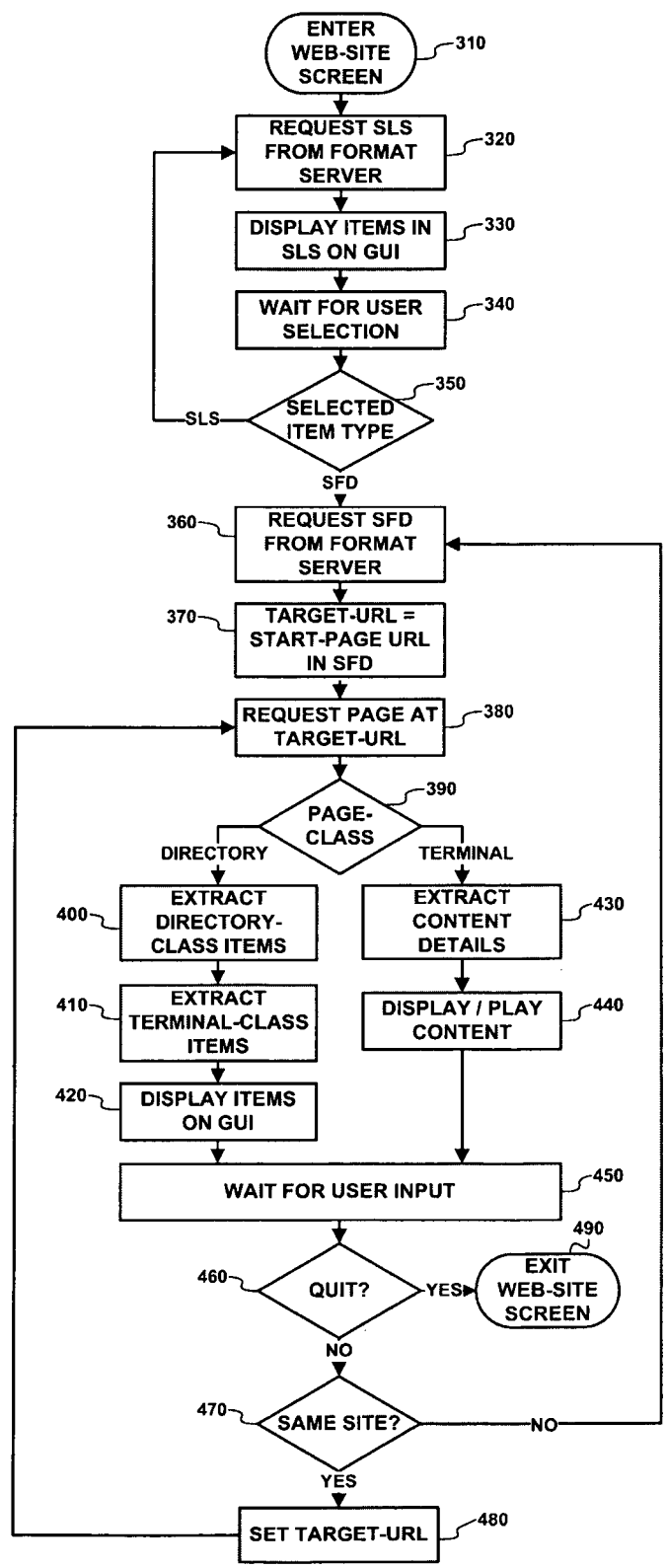
FIG. 2 is a flow diagram showing a method for itemising web pages.

Referring to FIG. 2, a method for receiving and displaying the contents of a website on a TV screen is now described. By selecting the "Websites" button on the Main Menu, the user requests to enter the "Websites" screen at step 310. In response, at step 320 the STB queries the "index.sls" file from the format server. The URL of the SLS server is preferably put into the STB's persistent memory during production, which, for exemplary purposes only, will be taken to be "http://sfdserver.com". In a preferred embodiment, the format server maintains the SLS and SFD documents in an XML-like format.

An example of the SLS document index.sls is provided in FIG. 3. The SLS document may either contain links to other SLS documents which have further sub-elements, or it may contain links to SFD documents which contain data about the format of one particular website. The example SLS document in FIG. 3 contains two items 2120, 2130 that represent links to other SLS documents, and one item 2140 that represents a direct link to the SFD file for the BBC News website. In a preferred embodiment, as a minimum, the SLS file contains the name and the file link for each item. Other details that may optionally be included for an item in an SLS file include, the item's textual description and a thumbnail icon image for visual representation of the item. The SLS file also contains a header with a version number 2110 that may be used to test the compatibility of a particular client with a particular SLS file received from a format server.

Upon receiving the SLS file, at step 330 in FIG. 2 the STB parses it to extract the details of each item and presents the items as part of the STB's native GUI. The embodiment with the exemplary GUI presented in FIGS. 5 and 6 may display these details as shown in FIG. 7. All the items present in the SLS file are put under the header "Links" 1170 on the screen, and when a particular item is highlighted by the user, the item's details are also displayed. By way of example only, when the highlighted item 1180 in FIG. 7 is "BBC News", the STB will get the item details from entry 2140 in the SLS file in FIG. 3. The corresponding name, description and thumbnail icon are displayed respectively at 1150, 1160 and 1190 on the screen, as shown in FIG. 7.

Referring again to FIG. 2, when the user selects a particular item at step 340, and if the selected item points to a SFD-type item at step 350, this triggers at step 360 a request from the STB to the format server for the SFD file associated with the selected item. For example, when the user selects the "BBC News" item on the GUI in FIG. 7, the corresponding file is identified from the item entry 2140 in the SLS file, which is "bbc.sfd". The STB then requests the "bbc.sfd" file from the format server.

An example of an SFD file that may be returned by the format server is shown in FIG. 4. Like the SLS file in FIG. 3, the SFD file also contains a header 2210 with a version number, for testing the STB's compatibility with it. The SFD file includes the general properties of the website 2220, and the format details 2230, 2240 of each different page type on a website. As a minimum, the general properties 2220 of the website preferably include the URL of the start-page for the website and the format-id of the start-page.

Next, at step 370 the STB extracts the start-page of the selected website from the SFD file, and, at step 380, requests it directly from the website. Thus, there is no direct involvement of the format server in providing the HTML code of the requested website, which is instead received over the internet directly from the appropriate web server. For example, according to the SFD file presented in FIG. 4, the start-page that will be requested is http://news.bbc.co.uk/1/hi/video_and_audio/default.stm The SFD file also indicates 2220 that the format-id of the start-page is "top-level-dir". Hence, when the STB receives the HTML for the start-page, the page-format details for "top-level-dir" 2240 are used to itemise the page.

Any web page is categorized into either a directory-class page or a terminal-class page. For each directory-class page and a terminal-class page, there is at least one corresponding page-format entry in the SFD file. The example SFD file in FIG. 4 only provides a single directory-class entry 2230, and a single terminal-class entry 2240, but other websites may well have more.

The number of such entries in a web-site's SFD file is equal to the number of different types of page formats that the client STBs will be allowed to browse. Each page-format entry in the SFD file must have a different ID associated with it. Using the "top-level-dir" page-format details 2240, the STB itemises the received web page by using "finders". A finder may be a regular-expression to be used with a regular expression engine 260 embedded into the STB, or it may be a downloadable script, such as a perl script, that may be run with a scripting engine 250 embedded in the STB. The page-format sections in the SFD file include details about the finders for various item properties.

For directory-class web-pages, the properties that must be "found" for each item are an item's name, the URL of its target page, the class of its target page and the ID of its target page. For terminal-class web-pages, the properties that are preferably "found" for each item are the item's name, the URL of the media content that the web-page includes, and the format of the media content. Other item properties, such as the URL of a thumbnail image or the item description are optional.

Returning to FIG. 2, after step 380, the page-class of the BBC News web page will be identified as "directory" at step 390. Using the finders shown in the page-format section 2230 for "top-level-dir", the STB itemises the returned BBC News web page by extracting the name, description and target-URL of each "interesting" item at steps 400 and 410. The results are then displayed on the screen in a format similar to other screens of the native GUI at step 420. Afterwards, the GUI waits for user input at step 450.

Figure 8:
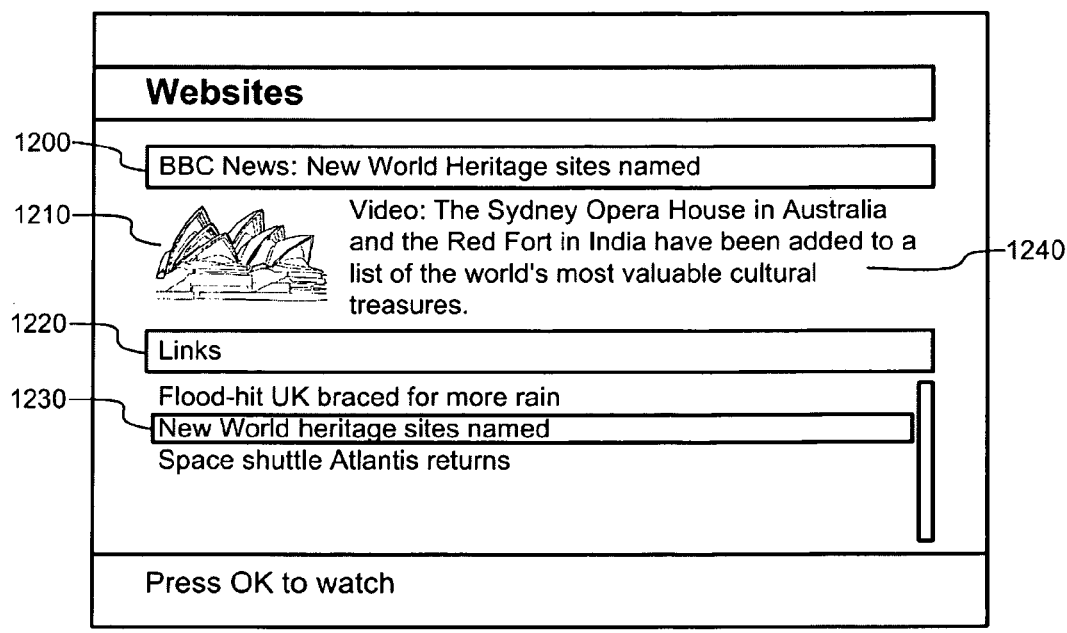

FIG. 8 shows a schematic representation of a "Websites screen". In one particular exemplary embodiment, the list of items 1230 is displayed under the "Link" header 1220, and the details of each item, such as the name 1200, thumbnail-image 1210 and description 1240 are displayed at the top of the screen in accordance with the native GUI of this particular client.

Referring to FIG. 2, when there is any input from the user, step 450 is followed by the test in step 460. If the user wishes to quit the Web-Sites screen, the Web-Sites screen is closed at step 490. Otherwise, step 460 is followed by step 470 and another test is made for whether or not the user wishes to continue with content from the same web-site that the user is currently browsing. If the user wishes to continue with content from another web-site, if it's not already stored at the client the new web-site's SFD file must be obtained from the format server first, so the procedure will be repeated from step 360.

At step 470 of FIG. 2, if the user wishes to continue with content from the same web-site, for example by selecting any of the items shown on the exemplary GUI in FIG. 8, the URL of the selected target item is determined at step 480, and this target-URL is requested directly from a web server at 380, from which point on the same process will be repeated.

Referring to FIG. 4, the page-format section 2230 indicates to the STB that the ID for the target page is "terminal-content". Therefore, when the requested page arrives at step 390 of FIG. 2, execution continues from step 430. At this step, the page-format section 2240 in FIG. 4 corresponding to the ID "terminal-content" is used by the STB to itemise the new page. Since the new page is a terminal page, it does not contain sub-items, but it includes media content, such as textual or audio-visual data. A preferred embodiment displays this media content in accordance with the client's native GUI. For example, a DVR STB that displays recorded video material in full-screen mode, may also display video content coming from a web-server in full-screen mode.

Thus a method, apparatus and system is provided that makes it simpler to navigate through content in web pages on a set-top box connected to a TV screen. In practice the entire system will include a plurality of client set-top box devices connected to the internet, and a format server, also connected to the internet. The format server contains information about how data is laid out on HTML pages making up specific websites. By obtaining the format details of pages on a web-site from the format server, a set-top box "learns" how to "itemise" the individual data and link objects on a web-site's web-pages.

The set-top box processes the web data locally and uses this information to present web-page contents, preferably as a list of items, in a way that is easy-to-navigate on its native GUI. The use of a format data server also means that plural users can connect to it so that when a website's format changes the modifications to the SFD file need only be loaded up to the format server and not to each individual user.

Embodiments of the present invention have been described with particular reference to the examples illustrated. However, it will be appreciated that variations and modifications may be made to the examples described within the scope of the present invention.

The invention claimed is:

1. A method of itemizing web pages for display on a screen in a system comprising a server connected to the internet, the method comprising:
   requesting, by a client device, a format file for a requested unitemized website from a server that is configured to send format files containing format data in respect to one or more accessible unitemized websites but does not send the requested unitemized websites themselves;
   wherein the format data includes general properties of the requested unitemized website and detail of each different page type on the requested unitemized website;
   accessing, by the client device, the requested unitemized website, via a web server that is different from the server that sends the format files, upon receipt of the format file; and
   when the requested unitemized website has been accessed, itemizing locally, by the client device, the requested previously unitemized website based on the format data in the format file.

2. The method according to claim 1, comprising, prior to requesting the format data for the requested unitemized website, requesting from the server a website list of accessible websites in respect to which the server contains the corresponding format data.

3. The method according to claim 1, comprising, at the client device, displaying the website using a native graphic user interface of the client device.

4. The method according to claim 2, comprising, at the client device, displaying the website list using a native graphic user interface of the client device.

5. The method according to claim 1, in which the accessed requested website is itemized locally at the client device using an HTML itemizer.

6. The method according to claim 1, in which at least some of the accessed requested websites include video content, wherein the video content is displayed by the client device using a native graphic user interface of the client device.

7. The method according to claim 1, in which the client device is arranged in communication with a television display and the client device is arranged to display images of the accessed website content on the television display.

8. The method according to claim 1, comprising upon accessing the requested previously unitemized website, determining a class of each of the pages.

9. The method according to claim 8, in which if the class of the respective page is determined to be terminal, content of the respective page is displayed.

10. The method according to claim 8, in which if the class of the respective page is determined to be directory, directory and terminal items if present are extracted for display.

11. The method according to claim 1, in which itemized items are displayed to a user as a list.

12. A system for itemizing web pages for display, the system comprising:
   a server computer for storing format files containing format data indicative of the format of one or more unitemized websites;
   wherein the format data includes general properties of the unitemized website and detail of each different page type on the unitemized website; and, one or more client devices connectable to the server computer, at least one of the client devices being arranged to request format data of a respective one of the uninitialized websites from the server, wherein upon receipt of the request, the server computer is arranged to provide to the requesting client device the format file containing format data indicative of the format of the respective of the format of the respective requested unitemized website but the server computer does not provide the requested unitemized websites themselves, the client device being arranged locally to access the requested unitemized website and use the format data to itemize content from the requested previously unitemized website for display.

13. The system according to claim 12, in which the one or more client devices are set top boxes.

14. The system according to claim 12, wherein the client device is arranged to display the accessed requested previously unitemized website as part of a native user interface of the client device.

15. The system according to claim 12, in which the server computer is an HTTP server.

16. The system according to claim 12, wherein the server computer includes storage having a list of websites accessible by the system, and being arranged to provide to one of the client devices, upon request, the list of accessible websites.

17. A client device for connection to the internet for itemizing of web pages for display, the client device comprising:

a processor arranged, upon activation by a user, to request and to receive from a format server a format file containing format data in respect of a requested unitemized website but the format server does not provide the requested unitemized website itself;

wherein the format data includes general properties of the requested unitemized website and detail of each different page type on the requested unitemized website; and memory for storage of the format file, the client device being configured and arranged to access the requested previously unitemized website and, itemize locally at the client device contents for display based on the format file.

18. The client device according to claim 17, comprising an HTML itemizer for itemizing locally the received website at the client device.

19. The client device according to claim 17, comprising an XML parser for parsing received XML documents.

20. The client device according to claim 18, in which the HTML itemizer includes a scripting engine for interpreting commands and a regular expression engine for searching for textual patterns within received HTML code of a website.

21. The client device according to claim 19, in which the client device is embodied by one or more of a stand-alone Set Top Box dedicated for viewing web pages on a television, functionality embedded into a digital television receiver Set Top Box, a digital television recorder, a television receiver, or a personal computer.

22. The client device according to claim 19, the client device including a native graphic user interface and being configured and arranged to display locally itemized websites using a native graphic user interface.

* * * * *